United States Patent
Molnar et al.

(10) Patent No.: US 7,283,794 B2
(45) Date of Patent: Oct. 16, 2007

(54) LOW VOLTAGE DIGITAL INTERFACE

(75) Inventors: Alyosha C. Molnar, Costa Mesa, CA (US); Rahul Magoon, Irvine, CA (US)

(73) Assignee: Skyworks Solutions, Inc., Irvine, CA (US)

(*) Notice: Subject to any disclaimer, the term of this patent is extended or adjusted under 35 U.S.C. 154(b) by 1292 days.

(21) Appl. No.: 09/823,681

(22) Filed: Mar. 30, 2001

(65) Prior Publication Data

US 2002/0142741 A1 Oct. 3, 2002

(51) Int. Cl.
*H04B 1/04* (2006.01)

(52) U.S. Cl. .................. 455/127.5; 455/343.1; 455/164.2; 455/183.2; 455/333

(58) Field of Classification Search .......... 455/127, 455/164.2, 183.2, 333, 127.1, 127.2, 127.3, 455/127.4, 127.5, 373.1–6, 343.1, 334; 326/68, 326/62, 80
See application file for complete search history.

(56) References Cited

U.S. PATENT DOCUMENTS 5,297,203 A * 3/1994 Rose et al. ............. 455/462 X
5,705,940 A * 1/1998 Newman et al. ......... 326/68 X

FOREIGN PATENT DOCUMENTS

EP       0 798 880 A2    1/1997
WO    WO 92/01337      1/1992

OTHER PUBLICATIONS

U.S. Appl. No. 09/260,919, filed Mar. 2, 1999, Dmitriy Rozenblit, et al., "Direct Conversion Receiver", 43 pages.
U.S. Appl. No. 09/370,099, filed Aug. 6, 1999, Magoon, et al., "Programmable Frequency Divider", 60 pages.
U.S. Appl. No. 09/386,865, filed Aug. 31, 1999, Dmitriy Rozenblit, et al., "Multi–Band Transceiver Utilizing Direct Conversion Receiver", 77 pages.

U.S. Appl. No. 09/398,911, filed Sep. 14, 1999, Damgaard and Magoon, "Wireless Transmitter Having a Modified Translation Loop Architecture", 47 pages.

Ian Doyle, "A Simplified Subharmonic I/Q Modulator", *Applied Microwave & Wireless*, Oct. 1998.

Takafumi Yamaji et al., "An I/Q Active Balanced Harmonic Mixer with IM2 Cancelers and a 45° Phase Shifter", *IEEE Journal of Solidfa–State Circuits*, vol. 33, No. 12, Dec. 1998.

* cited by examiner

*Primary Examiner*—Philip J. Sobutka
(74) *Attorney, Agent, or Firm*—Thomas, Kayden, Horstemeyer & Risley

(57) ABSTRACT

A system is disclosed for interfacing a wireless communication device baseband module and a radio frequency integrated circuit. The system accepts a control signal from the baseband module. The control signal from the baseband module is generally at a first baseband voltage. The first baseband voltage is generally the baseband operating voltage level. The system distributes the control signal, via data latches, to a plurality of local level shifters. The plurality of local level shifters are associated with components of the radio frequency integrated circuit. The local level shifters convert the control signal to a shifted control signal at a second voltage level. The second voltage level is generally the component operating voltage. The shifted control signal may be maintained at the component while the radio frequency integrated circuit is intermittently shutdown. The system eliminates the need to reprogram radio frequency integrated circuit components after the shutdown period.

33 Claims, 4 Drawing Sheets

FIG. 1 Wireless Communication System

Mobile Communication Device

Local Level Shifter

LOW VOLTAGE DIGITAL INTERFACE

BACKGROUND OF THE INVENTION

1. Field of the Invention

This invention is generally related to wireless communication systems and, more particularly, is related to a system for interfacing a wireless communication device baseband module with a wireless communication device radio frequency (RF) integrated circuit.

2. Related Art

Wireless communication systems are an integral component of the ongoing technology revolution and are evolving at an exponential rate. The wireless communication systems are generally RF communication systems. Many wireless communication systems are configured as "cellular" systems, in which the geographic area to be covered by the cellular system is divided into a plurality of "cells." Mobile communication devices (e.g., wireless telephones, pagers, personal communications devices, and the like) in the coverage area of a cell communicate with a fixed base station within the cell. The wireless communication system is also capable of communicating with stationary communication devices, though most applications employ the mobile communication devices described above.

Typical wireless communication devices may be divided into four sections: a baseband module, an integrated analog module, a power module, and a radio frequency module. The radio frequency module is generally responsible for communicating with the fixed base stations. The radio frequency module communicates with the base station via high frequency carrier waves. The radio frequency module accepts data from the baseband module and inserts the data in the carrier wave. The radio frequency module then sends the carrier wave containing the data to the base station. The radio frequency module also removes data from incoming carrier waves and passes the data to the baseband module. The baseband module interfaces with the wireless communication device user, through a user interface, and processes incoming and outgoing data from the radio frequency module, a speaker, and a microphone.

The baseband module and the radio frequency module may include separate integrated circuits with different operating characteristics. In general, the baseband module controls the function of the components of the wireless communication module, including the components of the radio frequency module. The baseband module controls the radio frequency integrated circuit through a serial logic interface and a plurality of logic control signals. The baseband module generally reconfigures the radio frequency integrated circuit when the radio frequency integrated circuit is powered up.

Due to the different functions of the baseband module and the radio frequency module, the integrated circuits for the modules generally have different operating characteristics. The baseband integrated circuit may be a relatively low voltage (e.g. 1.8 volts), high-density contemporary complementary metal-oxide semiconductor (CMOS) processor. The baseband module processes a great deal of digital information and CMOS technology allows the implementation of a large number of digital functions. CMOS logic gates typically output logic signals referenced to the CMOS supply voltage.

Radio frequency integrated circuits generally run at relatively higher voltages, e.g. 2.7–3.0 volts. Some components within the radio frequency integrated circuit may run at different voltages than other components within the radio frequency integrated circuit. The components within the radio frequency integrated circuit generally require digital input signals at the operating voltage of the component. Therefore, the CMOS output logic signals are typically shifted to the higher voltage level of the radio frequency integrated circuit component. In order to conserve power, the radio frequency integrated circuit is typically shut down when it is not in use. Shutting down the radio frequency integrated circuit is particularly useful in time division multiple access (TDMA) wireless communication systems since there is idle time between transmitting and receiving data. When the radio frequency integrated circuit is powered up, the baseband module has to reconfigure the radio frequency integrated circuit. This results in a great deal of undesirable baseband module programming latency and excessive power consumption.

Thus, a need exists in the industry to address the problems noted above.

SUMMARY

A low voltage digital interface provides a system for interfacing a wireless communication system mobile communication device baseband module with a mobile communication device radio frequency integrated circuit. The low voltage digital interface can be implemented as follows. A serial interface accepts a control signal from a baseband module at the baseband module operating voltage. The control signal includes operating instructions for components of a radio frequency integrated circuit. The serial interface distributes portions of the control signal to data latches that maintain a connection to local level shifters associated with the integrated circuit components. The local level shifters convert the control signals at the baseband module operating voltage to shifted control signals at the operating voltage of the integrated circuit components. The shifted control signals remain available to the integrated circuit components even when the integrated circuit goes into standby, or shutdown, mode.

Other systems, methods, features and advantages of the invention will be or will become apparent to one having ordinary skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

1. Overview

Figure 1:
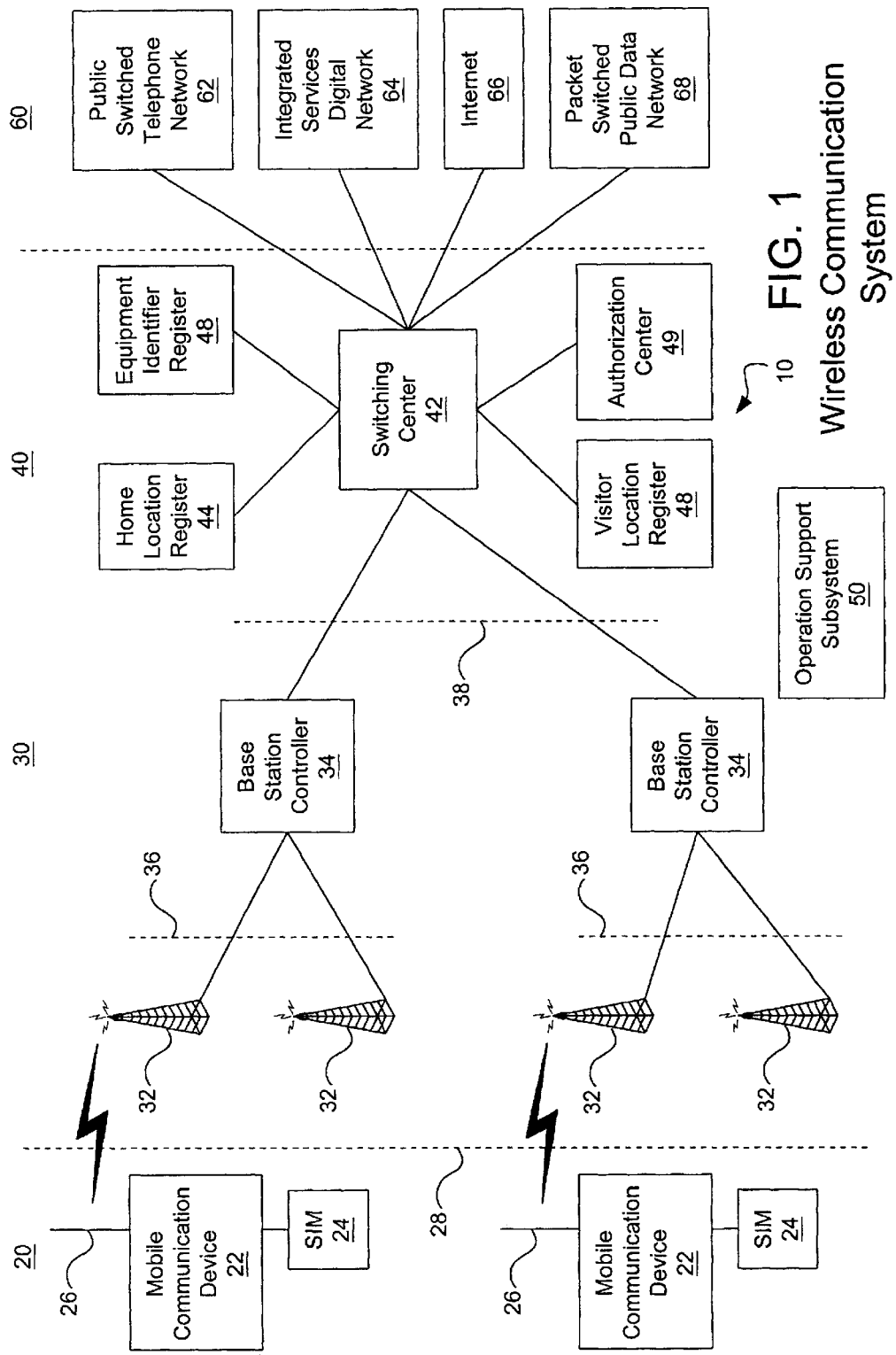
FIG. 1 is a block diagram of an exemplar wireless communication system including mobile communication devices.

Before describing the low voltage digital interface in detail, it is useful to describe an example environment in which the low voltage digital interface can be implemented. One such example is a wireless communication system 10. FIG. 1 is a block diagram of an exemplar wireless communication system 10 including mobile communication devices 22. The mobile communication devices 22 may be cellular phones. This block diagram exemplifies a typical system and therefore should not be understood to be the extent of the possible use for the low voltage digital interface. For illustrative purposes, the low voltage digital interface will be described in the context of a wireless communication system adhering to the Global System for Mobile Communications (GSM) standard. It should be understood, however, that the low voltage digital interface could be implemented in the context of other wireless communication systems.

One of the most common forms of wireless communications systems, mobile cellular systems, were originally developed as analog systems. After their introduction for commercial use in the early 1980s, mobile cellular systems began to experience rapid and uncoordinated growth. In Europe, for example, individual countries developed their own systems. Generally, the systems of individual countries were incompatible with each other. The incompatibility constricted mobile communications within national boundaries and restricted the market for mobile equipment developed for a particular country's system.

In 1982, in order to address this growing problem, the Conference of European Posts and Telecommunications (CEPT) formed the Groupe Spéciale Mobile (prior to 1991 was also known as GSM) to study and develop a set of common standards for a future pan-European cellular network. It was recommended that two blocks of frequencies in the 900 MHz range be set aside for the system. The initial goals for the new system included international roaming ability, good subjective voice quality, compatibility with other systems such as the integrated services digital network (ISDN), spectral efficiency, low cost mobile communication devices 22 and low cost base transceiver stations (BTS) 32, and the ability to support new services and a high volume of users.

One of the initial, major decisions in the development of the GSM standard was adoption of a digital, rather than an analog, system. As mentioned above, analog systems were experiencing rapid growth and the increasing demand was straining the capacity of the available frequency bands. Digital systems offer improved spectral efficiency and are more cost efficient. The quality of digital transmission is also superior to that of analog transmission. Background sounds, such as hissing and static, and degrading effects, such as fadeout and cross talk, are largely eliminated in digital systems. Security features such as encryption are more easily implemented in digital systems. Compatibility with the integrated services digital network (ISDN) 64 is more easily achieved with a digital system. Finally, a digital approach permits the use of very large scale integration (VLSI), thereby facilitating the development of smaller and more cost efficient mobile handsets.

In 1989, the European Telecommunications Standards Institute (ETSI) took over responsibility for the GSM standards. In 1990, phase I of the standard was published and the first commercial services employing the GSM standard were launched in 1991. It was also renamed in 1991 as the Global System for Mobile Communications (still GSM). After its early introduction in Europe, the standard was elevated to a global stage in 1992 when introduced in Australia. Since then, GSM has become the most widely adopted and fastest growing digital cellular standard, and is positioned to become the world's dominant cellular standard. As of January 1999, according to the GSM memorandum of understanding association, GSM accounted for more than 120 million subscribers.

Two frequency bands of 25 MHz each were allocated for GSM use: the 890–915 MHz band and the 935–960 MHz band. The 890–915 MHz band is reserved for transmission or "uplink" (mobile communication device 22 to base transceiver station 32), and the 935–960 MHz band is reserved for reception or "downlink" (base transceiver station 32 to mobile communication device 22). An extra ten MHz of bandwidth was later added to each frequency band. The standard incorporating this extra bandwidth (resulting in two 35 MHz bands) is known as Extended GSM (EGSM). In EGSM, the transmission band covers 880–915 MHz and the receiving band covers 925–960 MHz. The terms GSM and EGSM are used interchangeably, with GSM sometimes used in reference to the extended bandwidth portions (880–890 MHz and 925–935 MHz). Sometimes, the originally specified 890–915 MHz and 935–960 MHz bands are designated Primary GSM (PGSM). In the following description of the wireless communication system 10, GSM will be used in reference to the extended bandwidth (35 MHz) standard.

Due to the expected widespread use of GSM, capacity problems in the 900 MHz frequency bands were anticipated and addressed. ETSI had already defined an 1800 MHz variant (digital communication system (DCS) or GSM 1800) in the first release of the GSM standard in 1989. In DCS, the transmission band covers 1710–1785 MHz and the receiving band covers 1805–1880 MHz. In the United States, the Federal Communications Commission (FCC) auctioned large blocks of spectrum in the 1900 MHz band, aiming to introduce digital wireless systems to the country in the form of a mass market Personal Communication Service (PCS). The equivalent of DCS GSM service in the United States is known as PCS or GSM 1900. In PCS, the transmission band covers 1850–1910 MHz and the receiving band covers 1930–1990 MHz.

Regardless of the GSM standard used, once a mobile communication device 22 is assigned a channel, a fixed frequency relationship is maintained between the transmit frequency and receive frequency. In GSM, this fixed frequency relationship is 45 MHz. If, for example, a mobile communication device 22 is assigned a transmit channel at 895.2 MHz, its receive channel will always be at 940.2 MHz. A fixed frequency relationship is also maintained in DCS and PCS, however, the frequency relationship is wider. In DCS, the receive channel is always 95 MHz higher than the transmit channel and, in PCS the receive channel is always 80 MHz higher than the transmit channel.

The architecture of one implementation of a wireless communication system 10 is depicted in block form in FIG. 1. Wireless communication system 10 is divided into four interconnected components or subsystems: a mobile device subsystem 20, a base station subsystem 30, a network switching subsystem 40, and an operation support subsystem 50. Generally, mobile device subsystem 20 is the mobile communication device 22 (e.g., wireless telephones, pagers, personal communications devices, and the like) carried by a user of the mobile communication device 22. Though entitled a "mobile" communication device 22, there is nothing about the technology that requires the device be mobile and those having ordinary skill in the art will recognize applications for the low voltage digital interface other than in relationship to the wireless communication system 10 and the mobile communication device 22.

The base station subsystem 30 interfaces with multiple mobile communication devices 22 and manages the radio transmission paths between the mobile communication devices 22 and the network switching subsystem 40. The network switching subsystem 40 manages the wireless communication system 10 switching functions and facilitates communications with other systems such as the public switched telephone network (PSTN) 62 and the integrated services digital network 64. Furthermore, the operation support subsystem 50 facilitates operation and maintenance of the wireless communication system 10.

Mobile device subsystem 20 comprises a plurality of mobile communication devices 22 each associated with a subscriber identity module (SIM) 24. Mobile communication device 22 includes an antenna 26. Subscriber identity module 24 is a memory device that stores identification information regarding the subscriber and the mobile communication device 22. The subscriber identity module 24 may be implemented as a smart card or as a plug-in module and activates service from any wireless communication device 22 in the wireless communication system 10. Among the information stored on subscriber identity module 24 may be a unique international mobile subscriber identity (IMSI) that identifies the user of the mobile communication device 22 to the wireless communication system 10, and an international mobile equipment identity (IMEI) that uniquely identifies the mobile communication device 22. A user can access the wireless communication system 10 via any mobile communication device 22 or terminal through use of the subscriber identity module 24. Other information, such as a personal identification number (PIN) and billing information, may be stored on subscriber identity module 24.

Mobile device subsystem 20 communicates with a base station subsystem 30 across a standardized "Um" or radio air interface 28. Base station subsystem 30 includes multiple base transceiver stations 32 and base station controllers (BSC) 34. A base transceiver station 32 is usually in the geographic center of a cell and includes one or more radio transceivers and an antenna. The base transceiver station 32 establishes radio links and handles radio communications over the "Um" interface 28 with mobile communication devices 22 within the cell. The transmitting power of the base transceiver station 32 defines the size of the cell. Each base station controller 34 manages a plurality of base transceiver stations 32. Communication between base transceiver station 32 and base station controller 34 is over a standardized "Abis" interface 36. The base station controller 34 allocates and manages carrier frequency channels and controls handover of calls between the base transceiver stations 32 that the base station controller 34 manages.

Each base station controller 34 may communicate with the network switching subsystem 40 over a standardized "A" interface 38. The A interface 38 may use a switching system seven (SS7) protocol and allow the use of base stations and switching equipment made by different manufacturers. Switching center 42 is the primary component of the network switching subsystem 40. Switching center 42 manages communications between each mobile communication device 22 within the cells and between mobile communication devices 22 and public networks 60. Examples of public networks 60 that switching center 42 may interface with include the public switched telephone network (PSTN) 62, the integrated services digital network (ISDN) 64, the Internet 66, and the packet switched public data network (PSPDN) 68.

Switching center 42 may interface with various databases to manage communication and switching functions. For example, home location register (HLR) database 44 may contain details on each mobile communication device 22 user residing within the area served by the switching center 42, including subscriber identities, services that the subscriber has access to, and their current location within the system. Visitor location register (VLR) database 48 may temporarily store data relating to users roaming with a mobile communication device 22 within the coverage area of the switching center 42. Equipment identity register (EIR) database 48 may contain a list of mobile communication devices 22, each identified by an international mobile equipment identity that is valid and authorized to use the wireless communication system 10. Information relating to mobile communication devices 22 that have been reported as lost or stolen may be stored on a separate list of invalid mobile communication devices. The list of invalid mobile communication devices may assist in identifying persons who are illegally attempting to access the wireless communication system 10. The authorization center (AuC) database 49 stores authentication and encryption data and parameters that verify the identity of the user of the mobile communication devices 22.

Operation support subsystem 50 contains one or several operation maintenance centers (OMC) that monitor and maintain records on the performance of all components of the wireless communication system 10. Operation support subsystem 50 may maintain all hardware and system operations, manage charging and billing operations, and manage all mobile communication devices 22 within the system.

With respect to communications between the mobile communication device 22 and the base transceiver station 32, the available carrier frequency channels are distributed among the base transceiver stations 32 according to a base transceiver frequency plan. In the wireless communication system 10, the transmitting and receiving bands may be divided into 200 kHz carrier frequency channels. To increase system capacity, a time division multiple access (TDMA) frame structure may be used to subdivide each of the carrier frequency channels into multiple time slots. Each time slot may have a duration of approximately 0.577 milliseconds, and eight time slots may form a time division multiple access "frame," having a duration of 4.615 milliseconds. This framework permits simultaneous reception by as many as eight mobile communication devices 22 on a first carrier frequency channel and simultaneous transmission by as many as eight mobile communication devices 22 on a second carrier frequency channel.

2. Example Mobile Communication Device

Figure 2:
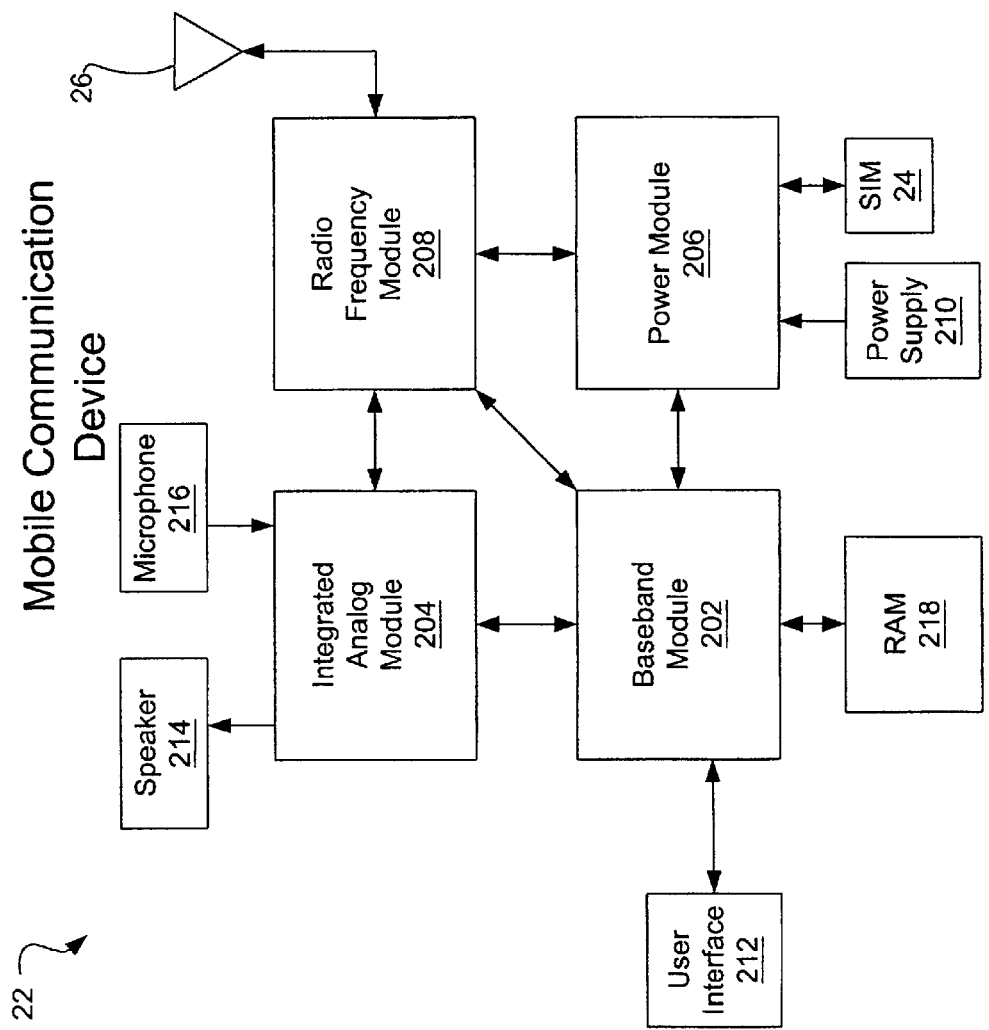
FIG. 2 is a block diagram of the internal components of the mobile communication device of FIG. 1.
Figure 3:
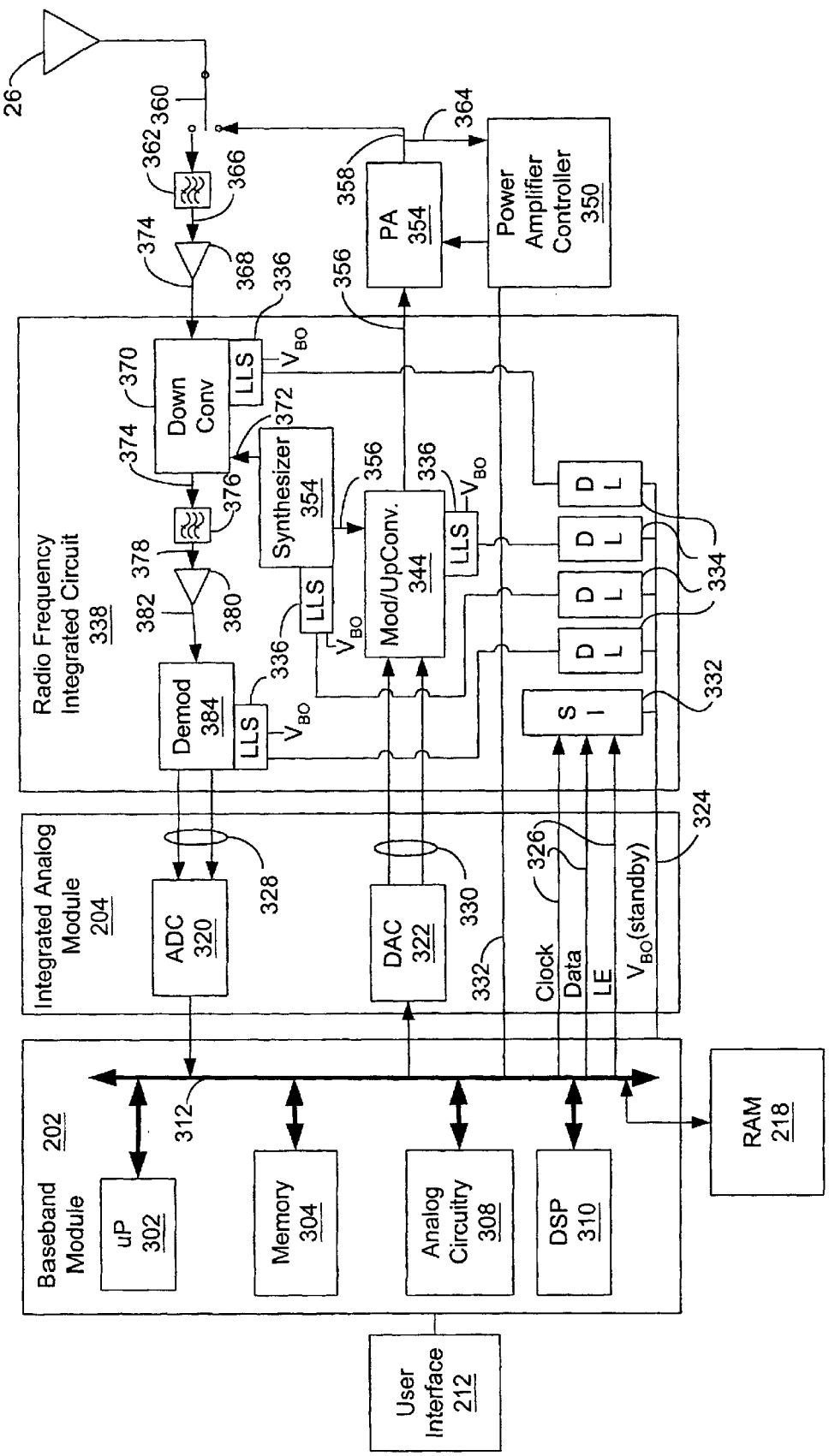
FIG. 3 is a block diagram of the baseband module, the integrated analog module, and the radio frequency module of FIG. 2.

FIG. 2 is a block diagram of the internal components of the mobile communication device 22 of FIG. 1 including a baseband module 202, an integrated analog module 204, a power module 206, and a radio frequency module 208. The radio frequency module 208 includes a radio frequency integrated circuit 338 (FIG. 3). The mobile communication device 22 may be implemented in many different ways having various configurations and architectures. Though the low voltage digital interface is not limited to any particular device or architecture, in order to provide a framework for describing the low voltage digital interface, an example mobile communication device 22 architecture is described with reference to FIG. 2. Those having ordinary skill in the art will recognize that many of the components described with reference to FIG. 2 may be eliminated or combined with other blocks without affecting the low voltage digital interface.

Mobile communication device 22 also includes a speaker 214, and a microphone 216 connected to the integrated analog module 204. The mobile communication device 22 further includes a user interface 212 and random access memory (RAM) 218 connected to the baseband module 202. A description of the architecture and functioning of each of the modules follows.

The baseband module 202 may include a baseband digital signal processor (DSP) 310 (FIG. 3), and all interface logic required for the mobile communication device 22. The baseband module 202 may be implemented as an integrated circuit on a single die. The baseband module 202 may also include a dual execution unit with dual multiply accumulation units, a logic unit and a barrel shifter. The baseband module 202 may be implemented in a 32-bit architecture that can handle single 32-bit, or a dual 16-bit, instructions.

Baseband module 202 directs the overall operation of the mobile communication device 22 and is ordinarily programmed or coded with a computer program or routine to enable the baseband module 202 to carry out its operation. In one implementation, baseband module 202 is housed in a 128 pin thin quad flat pack (TQFP) and, in another implementation, baseband module 202 is housed in a 160-pin 12×12 mm chip array ball grid array (CABGA) package. The CABGA package may allow for the design of smaller form factors resulting in a smaller mobile communication device 22.

The baseband module 202 may interface with the radio frequency module 208, the user interface 212, and the RAM 218. The baseband module may also interface with the speaker 214, and the microphone 216 via the integrated analog module 204. The user interface 212 may include a display and a keyboard. The integrated analog module 204 implements an analog-to-digital converter (ADC) 320 (FIG. 3), digital-to-analog converter (DAC) 322 (FIG. 3), and all other signal conversions required to permit communication between the baseband module 202 and the radio frequency module 208, the speaker 214, and the microphone 216. The signal conversions may include timing and interface operations. The integrated analog module 204 may include a coder/decoder. The integrated analog module 204 may be housed in a 100-pin TQFP, or a 100-pin 10×10 mm CABGA package.

The power module 206 is coupled to a power supply 210. The power supply 210 may be a battery or other power source and may be implemented as a power management integrated circuit (PMIC) on a single die. The power module 206 controls the power supply for all of the other components of the mobile communication device 22. The power module 206 may include error detection capabilities for portions of the mobile communication device 22. The error detection capabilities may significantly reduce debugging and test tasks.

The subscriber identity module (SIM) 24, that was described in reference to FIG. 1, may be associated with the power module 206. Through programmable switching regulators, each subscriber identity module 24 may allow the system to become independent of power supply 210 chemistry.

The radio frequency module 208 includes a transmitter for sending audio and/or data information, a receiver for receiving audio and/or data information, and a synthesizer 354 (FIG. 3). The synthesizer 354 (FIG. 3) works in cooperation with the transmitter and the receiver. The radio frequency module also includes a radio frequency integrated circuit 338 (FIG. 3). The radio frequency integrated circuit 338 may be a 48-pin TQFP package.

An overview of the operation of the mobile communication device 22 may be described in regard to the task of transmitting and receiving audio information. To transmit information, the integrated analog module 204 receives an analog audio signal from the microphone 216. The integrated analog module 204 converts the analog signal to a digital signal. The baseband module 202 processes the digital signal and converts the processed digital signal into baseband I and Q signals. The integrated analog module 204 converts the digital baseband I and Q signals into an analog stream. The transmitter of the radio frequency module 208 inserts the analog stream into an analog carrier waveform and sends the carrier waveform containing the audio information to a base transceiver station 32 via the antenna 26.

To receive information from the base transceiver station 32, the antenna 26 picks up an analog carrier waveform containing audio information. The radio frequency module 208 extracts the audio information in analog stream form from the analog carrier waveform. The integrated analog module 204 converts the audio stream into a digital signal. The baseband module 202 processes the digital signal. The integrated analog module 204 then converts the processed digital signal back into an analog signal that is transformed to an audible sound wave by the speaker 214.

FIG. 3 is a block diagram of the baseband module 202, the integrated analog module 204, and the radio frequency module 208 of FIG. 2. A radio frequency integrated circuit 338 is shown separate from other portions of the radio frequency module 208.

Baseband module 202 includes microprocessor (µP) 302, memory 304, analog circuitry 308, and digital signal processor (DSP) 310, in communication via bus 312. Bus 312, although shown as a single bus, may be implemented using multiple busses connected as necessary among the subsystems within baseband module 202. Microprocessor 302 and memory 304 provide the signal timing, processing and storage functions for mobile communication device 22. Analog circuitry 308 provides the analog processing functions for the signals within baseband module 202.

Baseband module 202 provides control signals to the radio frequency integrated circuit 338 serial interface (SI) 332 via connections 326. Control signals include a clock signal, a data signal, a latch enable signal, and other control signals not shown in FIG. 3. Although shown as originating at bus 312, the control signals may originate from the digital signal processor 310 or from microprocessor 302. Control signals other than those shown as terminating at serial interface 332 may be supplied to a variety of points within the radio frequency module 208. Baseband module 202 also supplies a baseband standby voltage as voltage $V_{BO}$ to the serial interface 332 via connection 324. The baseband standby voltage is also supplied to data latches (DL) 334 and local level shifters (LLS) 336 in the radio frequency integrated circuit 338. It should be noted that, for simplicity, only the basic components of mobile communication device 22 are illustrated.

Integrated analog module 204 includes analog-to-digital converter (ADC) 320 and digital-to-analog converter (DAC) 322. ADC 320 and DAC 322 also communicate with microprocessor 302, memory 304, analog circuitry 308 and DSP 310. DAC 322 converts the digital communication information within baseband module 202 into an analog signal for transmission to radio frequency module 208 via connection 330. Connection 330, shown as two directed arrows, includes the information that is to be transmitted by radio frequency module 208 after conversion from the digital domain to the analog domain.

The transmitter of the radio frequency module 208 includes a radio frequency integrated circuit 338, a dual power amplifier module (Dual PA) 352, a power amplifier controller 350, receive filter 362, and dual low noise amplifier 368. The radio frequency module 208 transmitter includes the dual power amplifier module 352, and the power amplifier controller 350. The dual power amplifier module 352 may include input and output matching, dynamic range, and power-added efficiency features. The dual power amplifier module 352 may be implemented in a 9×11 mm micromodule package.

The power amplifier controller 350 may include a 60 dB dynamic range, an error amplifier, an integrator, and a gain shaper. The power amplifier controller 350 may be capable of supporting 900, 1800 and 1900 MHz GSM frequency bands. If the mobile communication device 22 is capable of supporting 900, 1800 and 1900 MHz GSM frequency bands, the mobile communication device 22 is typically referred to as supporting triband operation. The power amplifier controller 350 may be implemented in a 20-pin thin shrink small outline package (TSSOP) chip.

The receiver of the radio frequency module 208 includes the dual low noise amplifier (LNA) 368 with selectable gain and the associated receive filter 362. The low noise amplifier 368 and receive filter 362 may be implemented in a 20-pin thin shrink small outline package.

The modulator/upconverter 346 receives a frequency reference signal from synthesizer 354 via connection 348. The modulator/upconverter 346 modulates and upconverts the received analog information and provides a phase modulated signal to dual power amplifier module (PA) 352 via connection 356. Dual power amplifier module 352 amplifies the modulated signal on connection 356 to the appropriate power level for transmission via connection 358 to antenna 26. Illustratively, switch 360 controls whether the amplified signal on connection 358 is transferred to antenna 26 or whether a received signal from antenna 26 is supplied to receive filter 362. The operation of switch 360 is controlled by a control signal from baseband module 202. Optionally, circuitry that enables simultaneous transmission and reception can replace switch 360.

A portion of the amplified transmit signal on connection 358 is supplied via connection 364 to power amplifier control 350 via connection 364. The power amplifier controller 350 supplies the control input to the dual power amplifier module 352.

In the radio frequency module 208, a signal received by antenna 26 will, at the appropriate time determined by baseband module 202, be directed via switch 360 to receive filter 362. Receive filter 362 filters the received signal and supplies the filtered signal on connection 366 to dual low noise amplifier (LNA) 368. Receive filter 362 may be a bandpass filter that passes all channels of the particular wireless communication system 10 the mobile communication device 22 is operating in. As an example, for a 900 MHz GSM system, receive filter 362 passes all frequencies from 935.1 MHz to 959.9 MHz, covering all 328 contiguous channels of 200 kHz each. The purpose of receive filter 362 is to reject all frequencies outside the desired region. Dual low noise amplifier 368 amplifies the weak signal on connection 366 to a level at that downconverter (DownConv) 370 can translate the signal from the transmitted frequency back to a baseband frequency. Alternatively, the functionality of dual low noise amplifier 368 and downconverter 370 can be accomplished using other elements, such as for example but not limited to, a low noise block downconverter (LNB).

Downconverter 370 receives the frequency reference signal from the synthesizer 354, via connection 372. The frequency reference signal instructs the downconverter 370 as to the proper frequency to downconvert the signal received from low noise amplifier 368 via connection 386. Downconverter 370 sends the downconverted signal via connection 374 to channel filter 376. Channel filter 376 filters the downconverted signal and supplies it via connection 378 to amplifier 380. The channel filter 376 selects the one desired channel and rejects all others. Using the GSM system as an example, only one of the 328 contiguous channels is to be received. After all channels are passed by receive filter 362 and downconverted in frequency by downconverter 370, only the one desired channel will appear precisely at the center frequency of channel filter 376. The synthesizer 354, by controlling the reference frequency supplied on connection 372 to downconverter 370, determines the selected channel. Amplifier 380 amplifies the received signal and supplies the amplified received signal via connection 382 to demodulator (Demod) 384. Demodulator 384 recovers the transmitted analog information and supplies a signal representing this information via connection 328 to ADC 320. ADC 320 converts these analog signals to a digital signal at baseband frequency and transfers the digital signal to the digital signal processor 310 via bus 312.

3. Low Voltage Digital Interface

An embodiment of the low voltage digital interface includes a radio frequency integrated circuit 338 having a serial interface 332, data latches 334, and local logic shifters 336. The local logic shifters 336 are associated with various components of the radio frequency integrated circuit 338. As illustrated in FIG. 3, a local logic shifter is associated with the demodulator 384, the downconverter 370, the synthesizer 354, and the modulator/upconverter 346. The serial interface 332 is configured to accept baseband digital control signals at the baseband operating voltage $V_{BO}$. The radio frequency integrated circuit 338 is configured to accept the baseband operating voltage and to distribute the baseband operating voltage to various components within radio frequency integrated circuit 338. The various components having associated local logic shifters 336 are those that may maintain programming information during standby (shutdown) of the radio frequency integrated circuit 338.

The serial interface distributes the baseband digital control signals to a plurality of data latches 334. The data latches 334 pass the baseband digital control signals to the associated components of the radio frequency integrated circuit 338. The local logic shifters 336 convert the baseband digital control signals at the baseband operating voltage to component control signals at the component operating voltage $V_{CO}$.

The low voltage digital interface allows for memory based programming retention in the radio frequency integrated circuit 338 with no power consumption. The low voltage digital interface allows all but one of the supply voltages for the radio frequency integrated circuit 338 to be shut down. The one supply voltage maintained during shutdown, the baseband standby voltage at voltage level $V_{BO}$, maintains a voltage only for memory retention purposes. The components served by the supply voltage do not draw current in the steady state static condition. The components only draw current momentarily when the radio frequency integrated circuit 338 is programmed.

The local level shifters 336 allow for automatic internal level shifting of low voltage baseband digital control signals. The low voltage digital interface results in overall power savings for the wireless communication device 22 because test registers and main registers within the radio frequency integrated circuit 338 need not be reprogrammed when powering up the radio frequency integrated circuit 338. Although described with particular reference to a portable transceiver, the low voltage digital interface system can be implemented in any system in which it is desirable to minimize redundant programming and save power.

The low voltage digital interface system can be implemented in software, hardware, or a combination thereof. In one embodiment, selected portions of the low voltage digital interface system are implemented in hardware and software. The hardware portion of the invention can be implemented using specialized hardware logic. The software portion can be stored in a memory and be executed by a suitable instruction execution system (microprocessor). The hardware implementation of the low voltage digital interface system can include any or a combination of the following technologies, that are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

The low voltage digital interface system software, that comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium includes the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium that the program is printed, as the program can be electronically captured, via for instance optical scanning of the paper or other medium, then compiled, interpreted or otherwise processed in a suitable manner if necessary, and then stored in a computer memory.

Referring again to FIG. 3, the serial interface 332 may be a serial input/parallel output shift register. Serial interface 332 receives clock, data, and latch enable signals from bus 312 of the baseband module 202 via connections 326. Serial interface 332 also receives a standby baseband operating voltage at $V_{BO}$ via connection 324.

Parallel data latches 334 also receive the standby baseband operating voltage via connection 324. Though FIG. 3 shows four parallel data latches 334, a typical configuration may have 24 parallel data latches controlling various components in the radio frequency integrated circuit 338. Parallel data latches 334 supply a baseband digital control signal to local level shifters 336. Parallel data latches 334 remain enabled while the radio frequency integrated circuit 338 is on standby. However, the parallel data latches 334 do not draw any power. The parallel data latches may be implemented as complementary metal-oxide semiconductor circuits.

Local level shifters 336 receive baseband digital control signals from one of the plurality of parallel data latches 334. Local level shifters 336 are also supplied with the baseband supply voltage at $V_{BO}$ and the component control signal voltage at $V_{CO}$ (shown in FIG. 4). The component control signal voltage may be different for the various components of the radio frequency integrated circuit 338 components. The local level shifters 336 match the baseband digital control signal at $V_{BO}$ to the component control signal at $V_{CO}$ (FIG. 4).

FIG. 3 shows local level shifters 336 associated with four of the components of the radio frequency integrated circuit 338: the demodulator 384; the downconverter 370; the synthesizer 354; and the modulator/upconverter 346. The components shown in FIG. 3 associated with local level shifters 336 are for exemplar purposes only. One having ordinary skill in the art will recognize various additional components that may be associated with local level shifters.

Figure 4:
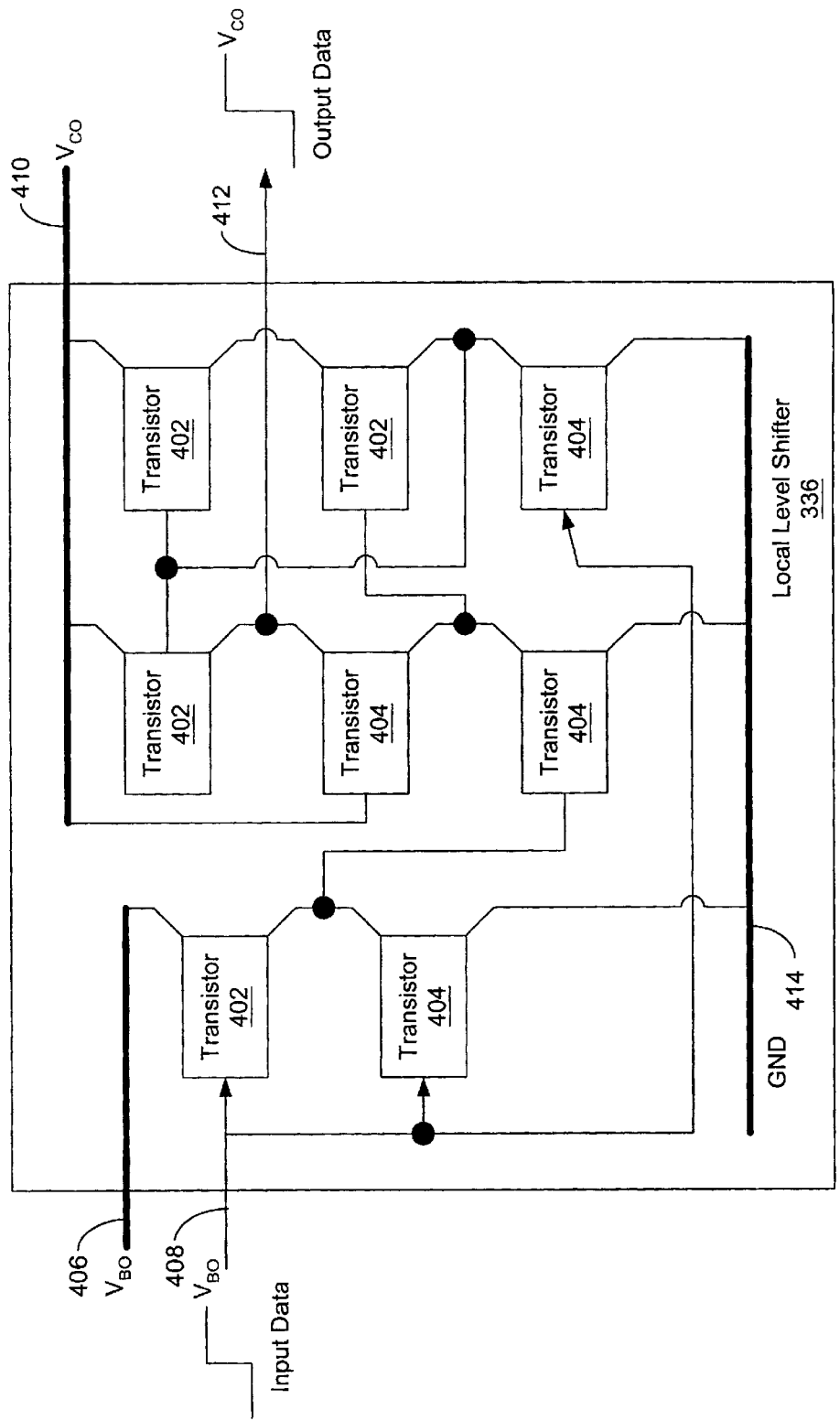
FIG. 4 is a block diagram of one of the local level shifters of FIG. 3.

FIG. 4 is a block diagram of one of the local level shifters 336 of FIG. 3. The local level shifter 336 includes eight transistors and a ground connection 414. Of the eight transistors, four are p-type field effect transistors 402 and four are n-type field effect transistors 404. Those having ordinary skill in the art are familiar with the operation of transistors 402 and 404.

The standby baseband operating voltage at $V_{BO}$ is supplied to the local level shifter 336 via connection 406. The baseband digital control signal, represented in FIG. 4 as a single positive voltage pulse at voltage level $V_{BO}$, is supplied to the local level shifter 336 via connection 408. The baseband digital control signal is supplied to the local level shifter 336 by one of the data latches 334. The local level shifter 336 senses the voltage level of the baseband digital control signal and shifts the baseband digital control signal voltage to the component operating voltage.

In FIG. 4, the component operating voltage is shown as $V_{CO}$ and is supplied to the local level shifter 336 via connection 410. Typically, a component will accept a component control signal at the component's own operating voltage $V_{CO}$. In other words, each component in the radio frequency integrated circuit 338 may operate at a different voltage than the other components in the radio frequency integrated circuit 338. In FIG. 4, the component control voltage is shown as an output of the local level shifter 336 on connection 412.

The local level shifter 336 may shift to different component operating voltages for components on the same integrated circuit. For example, the modulator/upconverter 346 (FIG. 3) may operate at a different voltage than the downconverter 370. The local level shifter 336 (FIG. 3) associated with each component may shift the baseband digital control signal at $V_{BO}$ to the appropriate component operating voltage for each of the components.

In operation, connections 326 pass baseband digital control signals from the baseband module 202 via the serial interface 332 and a data latch 334. The clock line, one of connections 326, has a clock signal from the baseband module 202. At every positive edge of the clock signal a new data bit is clocked into the serial interface 332. The latch enable line of connections 326 triggers the transfer of the data in the serial interface 332 to the data latches 334, each data latch receiving one bit of data from the serial interface 332. The data input stored in each of the data latches 334 is then sent to a local level shifter 336 associated with radio frequency integrated circuit 338 components such as the demodulator 384, the synthesizer 354, the modulator/upconverter 346, and the downconverter 370. The data input programs the radio frequency integrated circuit 338 component associated with the data latch 334.

It should be emphasized that the above-described embodiments of the low voltage digital interface, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included here within the scope of this disclosure and the low voltage digital interface and protected by the following claims.

What is claimed is:

1. A wireless communication device, comprising: a radio frequency module, the module comprising,
    a serial interface configured to accept input data at a first voltage, the input data including a control signal for an integrated circuit component;
    a local level shifter configured to accept a portion of the control signal at the first voltage, the local level shifter configured to maintain a shifted control signal, where the shifted control signal is at an operating voltage of the integrated circuit component, and where the shifted control signal controls an operation of the integrated circuit component; and
    a data latch configured to accept the portion of the control signal at the first voltage level from the serial interface, the data latch configured to output the portion of the control signal at the first voltage to at least the local level shifter, where the local level shifter is configured to maintain the shifted control signal in the radio frequency module while the radio frequency module is operating in a shutdown mode.

2. The wireless communication device of claim 1, further comprising:
    a second local level shifter, the second local level shifter configured to accept a second portion of the control signal at the first voltage, the second local level shifter being configured to maintain a second shifted control signal, where the second shifted control signal is at the operating voltage of a second integrated circuit component, where the second shifted control signal controls the operation of the second integrated circuit component;
    a second data latch, the second data latch configured to accept the second portion of the control signal at the first voltage level from the serial interface, the second data latch configured to output the second portion of the control signal at the first voltage level to the second local level shifter, where the second local level shifter is configured to maintain the second shifted control signal in the radio frequency module while the radio frequency module is operating in the shutdown mode.

3. The wireless communication device of claim 1, where the serial interface is a shift register.

4. The wireless communication device of claim 1, where the input data is generated by a baseband module.

5. The wireless communication device of claim 1, where the first voltage is the operating voltage of a baseband module integrated circuit.

6. The wireless communication device of claim 1, where the first voltage is less than the operating voltage of the integrated circuit component.

7. The wireless communication device of claim 1, where the radio frequency module includes a radio frequency integrated circuit.

8. The wireless communication device of claim 1, where the integrated circuit component is one of a synthesizer, demodulator, downconverter and modulator/upconverter.

9. The wireless communication device of claim 2, where the operating voltage of the second integrated circuit component is different from the operating voltage of the first integrated circuit component.

10. A system for maintaining programming information in a radio frequency module during a shutdown mode, comprising:
    means for accepting input data at a first voltage, the input data including control signals for a plurality of integrated circuit components;
    means for distributing the control signals to the plurality of integrated circuit components;
    means for converting the control signals at the first voltage to shifted control signals at an operating voltage of the integrated circuit components; and
    means for maintaining the shifted control signals in the radio frequency module while the radio frequency module is operating in the shutdown mode.

11. The system of claim 10, where the means for accepting input data is a shift register.

12. The system of claim 10, where the input data is generated by a baseband module.

13. The system of claim 10, where the first voltage is the operating voltage of a baseband module integrated circuit.

14. The system of claim 10, where the first voltage is less than the operating voltage of the integrated circuit component.

15. The system of claim 10, where the radio frequency module includes a radio frequency integrated circuit configured to operate in a wireless communication system.

16. The system of claim 10, where the means for converting is a means for converting the control signals at the first voltage level to shifted control signals at a plurality of integrated circuit components operating voltages.

17. The system of claim 10, where one of the integrated circuit components is one of a synthesizer, demodulator, downconverter and modulator/upconverter.

18. A method for maintaining programming information in a radio frequency module during a shutdown mode, comprising the steps of:
    accepting integrated circuit input data at a first voltage, the input data including control signals for a plurality of integrated circuit components;
    distributing the control signals to the plurality of integrated circuit components;
    converting the control signals at the first voltage to shifted control signals at an operating voltage of the integrated circuit components; and
    maintaining the shifted control signals in the radio frequency module while the radio frequency module is operating in the shutdown mode.

19. The method of claim 18, where the step of accepting input data includes the use of a shift register.

20. The method of claim 18, where the input data is generated by a baseband module.

21. The method of claim 18, where the first voltage is the operating voltage of a baseband module integrated circuit.

22. The method of claim 18, where the first voltage is less than the operating voltage of the integrated circuit component.

23. The method of claim 18, where the radio frequency module includes a radio frequency integrated circuit configured to operate in a wireless communication system.

24. The method of claim 18, where the step of converting includes the step of converting the control signals at the first voltage level to shifted control signals at a plurality of integrated circuit component operating voltages.

25. The method of claim 18, where one of the integrated circuit components is one of a synthesizer, demodulator, downconverter and modulator/upconverter.

26. A computer readable medium having a program for maintaining programming information in a radio frequency module during a shutdown mode, comprising:

logic for accepting input data at a first voltage, the input data including control signals for a plurality of integrated circuit components;

logic for distributing the control signals to the plurality of integrated circuit components;

logic for converting the control signals at the first voltage to shifted control signals at an operating voltage of the integrated circuit components; and logic for maintaining the shifted control signals in the radio frequency module while the radio frequency module is operating in the shutdown mode.

27. The program of claim 26, where the logic for accepting input data is a shift register.

28. The program of claim 26, where the input data is generated by a baseband module.

29. The program of claim 26, where the first voltage is the operating voltage of a baseband module integrated circuit.

30. The program of claim 26, where the first voltage is less than the operating voltage of the integrated circuit component.

31. The program of claim 26, where the radio frequency module includes a radio frequency integrated circuit configured to operate in a wireless communication system.

32. The program of claim 26, where the logic for converting is logic for converting the control signals at the first voltage level to shifted control signals at a plurality of integrated circuit components operating voltages.

33. The program of claim 26, where one of the integrated circuit components is one of a synthesizer, demodulator, downconverter and modulator/upconverter.

* * * * *